(12) United States Patent
Krysiak et al.

(10) Patent No.: US 8,925,244 B2
(45) Date of Patent: Jan. 6, 2015

(54) BENEFICIAL REUSE OF BIOSOLIDS

(75) Inventors: Michael Dennis Krysiak, Green Bay, WI (US); Daniel Paul Madigan, Green Bay, WI (US)

(73) Assignee: Encap LLC., Green Bay, WI (US)

( * ) Notice: Subject to any disclaimer, the term of this patent is extended or adjusted under 35 U.S.C. 154(b) by 721 days.

(21) Appl. No.: 11/079,324

(22) Filed: Mar. 14, 2005

(65) Prior Publication Data

US 2005/0172551 A1    Aug. 11, 2005

Related U.S. Application Data

(63) Continuation-in-part of application No. 10/271,072, filed on Oct. 15, 2002, and a continuation-in-part of application No. 10/379,643, filed on Mar. 5, 2003, and a continuation-in-part of application No. 10/686,241, filed on Oct. 15, 2003.

(51) Int. Cl.

| | | |
|---|---|---|
| *C05D 9/00* | (2006.01) | |
| *C05G 3/04* | (2006.01) | |
| *A01C 1/04* | (2006.01) | |
| *C05F 9/00* | (2006.01) | |
| *C05G 3/00* | (2006.01) | |
| *C09K 17/22* | (2006.01) | |
| *C09K 17/52* | (2006.01) | |
| *C02F 1/56* | (2006.01) | |
| *C02F 11/14* | (2006.01) | |
| *C02F 103/20* | (2006.01) | |

(52) U.S. Cl.
CPC . *C05G 3/04* (2013.01); *A01C 1/046* (2013.01); *C05F 9/00* (2013.01); *C05G 3/0047* (2013.01); *C09K 17/22* (2013.01); *C09K 17/52* (2013.01); *C02F 1/56* (2013.01); *C02F 11/14* (2013.01); *C02F 2103/20* (2013.01)

USPC ...................................................... 47/58.1 SC

(58) Field of Classification Search
USPC .................................... 47/58.1 SC; 71/21, 22
See application file for complete search history.

(56) References Cited

U.S. PATENT DOCUMENTS

| | | |
|---|---|---|
| 5,593,473 A | 1/1997 | Marchese |
| 5,776,350 A | 7/1998 | Miknevich et al. |
| 5,785,730 A | 7/1998 | Miknevich et al. |
| 6,245,121 B1 * | 6/2001 | Lamy et al. ........................ 71/1 |
| 6,808,636 B2 * | 10/2004 | Ward et al. .................... 210/710 |
| 6,863,826 B2 * | 3/2005 | Sheets ............................ 210/705 |
| 6,889,471 B2 * | 5/2005 | Arnold et al. ............ 47/58.1 SC |
| 7,410,589 B2 * | 8/2008 | Lakshman .................... 210/718 |

OTHER PUBLICATIONS

Daniel J. Wofford, Jr; Landscaping Uses of Cross-Linked Polyacrylamide in the Western United States; Sep. 22, 1999 (retrieved from internet: Jan. 18, 2008); http://web.archive.org/web/19990922024546/http://www.hydrosource.com/clpbbs02.htm.*

* cited by examiner

*Primary Examiner* — Kristen C Hayes
(74) *Attorney, Agent, or Firm* — Philip M. Weiss; Weiss & Weiss

(57) ABSTRACT

A method of controlling the movement of biosolids before, during, and after land application. This method aids in management of the problematic movement (i.e., runoff and leaching) of biosolids' components that have been shown to be harmful to human and/or environmental health through both direct and indirect routes of exposure. This method requires that water-soluble polyacrylamide(s) (WSPAM) be combined with the biosolids prior to land exposure.

56 Claims, No Drawings

BENEFICIAL REUSE OF BIOSOLIDS

RELATED APPLICATIONS

This application is a continuation-in-part of application Ser. No. 10/271,072 filed Oct. 15, 2002, Ser. No. 10/379,643 filed Mar. 5, 2003, application Ser. No. 10/686,241 filed Oct. 15, 2003.

FIELD OF THE INVENTION

The present invention relates to a method of controlling the movement of biosolids before, during, and after land application. This method aids in management of the problematic movement (i.e., runoff and leaching) of biosolids' components that have been shown to be harmful to human and/or environmental health through both direct and indirect routes of exposure. This method requires that water-soluble polyacrylamide(s) (WSPAM) be combined with the biosolids prior to land exposure.

BACKGROUND OF THE INVENTION

Agricultural land is a dynamic interwoven process of fostering growth and increasing of yield of useful plants. The first fertilizers were direct application of biosolids to increase crop yield. Early farmers did not understand alternative fertilizing methods and the long term effects of direct application on the surrounding soils. Early farms tended to have a smaller number of animals which in itself reduced the amount of biosolids being placed on soils. Larger farms today compound the environmental issues related to direct land application. As farms consolidate, biosolids are congregated and collected in a centralized location. Eventually, these biosolids find there way back to the nearby soils. Farms near creeks and streams have been found to have more serious environmental consequences. Even small farms near waterways today need to control runoff. In many states, farmers have been required to stop applying biosolids to lands in an environmentally sensitive area.

Biosolids can have positive impacts on farms. The mere mention of biosolids and manures brings up connotations of environmental concerns. It does not have to be that way. It is not the manures or it's contents that are bad. Even the phosphates in the biosolids themselves are nutrients that can be beneficial to crop yield. In fact, the nutrients would be highly sought after if their material characteristics were changed into traditional fertilizer granules. Granulation and drying of manures is becoming popular as a means of dealing with the problems of reapplying liquid and semisolid biosolids. However, the economics of this is more suitable to large corporate farms and cooperative efforts by local farms. The transportation costs to a regional granulation facility makes granulating a very difficult economic choice for many communities and smaller farmers. Marketing and finding outlets for these fertilizers is still another consideration. If additional costs are going to be applied to granulating, will there be a market for their product. Certainly, for the large farm this is so. But for the small farmer it is easy to understand why granulations is not a viable alternative. The present invention seeks out an alternative for the small farmer. The very same biosolid in a different form would certainly enhance the farmers crop yield while reducing or eliminating a very old environmental concern with regards to runoff and leaching of fertilizers, biosolids, and microbes. What was bad with biosolid in a liquid or semi solid state was the inability of the biosolids in their present state and material characteristics to stay where applied.

In recent years, where irrigation farming can be utilized, biosolids have been land applied and irrigation water with WSPAM applied to the soil either before or after to control the movement of biosolids. Where irrigation farming is not utilized, direct application occurs with increased control on the methods, timing and location of application.

Prior art patents have dealt with the material characteristics to reduce biosolid odors. Other patents have dealt with the material characteristics to dewater biosolids. Prior art patents have dealt with the material characteristics by drying biosolids. Still other patents have dealt with the characteristics by drying and forming granules from biosolids to make a fertilizer.

Water soluble polyacrylamide (WSPAMS) have been proposed as soil amendments for various agricultural purposes. Water soluble polymers, generically described as polyacrylamides (WSPAMs) appear to have a variety of beneficial soil amendment properties, including minimization of water runoff, erosion, and crusting, stabilization of soil structure, and binding of nutrients and microbes within soil.

Since the late 1980s there has been renewed interest in the use of water soluble polymers for soil physical improvement. Although Polyacrylamide (PAM) has been used for soil structure improvement since the 1940s and in agriculture since the 1950s the kinds of PAM used and the methods of application were different. Early PAMs had lower molecular weights than today's PAMS. They were applied to the soil at high rates, and were incorporated into the top soil by tillage.

In addition to the current interest in anionic PAMs as soil conditioners, they are widely used for other applications. PAMs are used for mineral and coal processing, petroleum production, paper making, water treating, food processing, and other miscellaneous applications.

Polyacrylamide (WSPAM) is a synthetic water-soluble polymer made from monomers of acrylamide. It binds soil particles in the water and irrigated furrow together, making particles larger so the water has a harder time washing them out of the field.

Polyacrylamides (WSPAM's) are compounds that hold on to nutrients and troublesome microbes before they can escape from soil and make their way to ponds, lakes, streams, rivers, and/or ground water. WSPAM has been shown to help keep nutrients, such as nitrogen and phosphorous in fertilizers, from traveling beyond the farm in irrigation runoff. Similarly, WSPAM helps keep disease causing microbes, like those in cow, pig, or fish manure, from being swept beyond the confines of farmyards or feedlots. WSPAM has four main physical characteristics. There are four main components to WSPAM: duration to dissolve, degree of charge, molecular weight, degree of branching.

High molecular weight and degree of branching are often inter-related. More branching results in a larger molecule and therefore a higher molecular weight. These molecules are more viscose in solution and often have more binding sites. The degree of charge refers to the strength of the ionic (positive and negative attraction) charge. The amount of time necessary to dissolve a WSPAM is dependent on chemical makeup, bonding, branching and particle size. The "work horse" polymers typically are water soluble polymers that have relatively high molecular weight and relatively high molecular charge density. They have a strong affinity to absorb water and enhance the germination of seeds. WSPAM used for erosion control has a slightly lower charge density than that used for seed germination and water retention. Polymers with a slightly lower charge density display the best results in precipitating out suspended solids in turbidity tests, thus their benefit to erosion control.

In the prior art, there is known a process for treating porcine excrement, so as to deodorize it. This process is more particularly known under the name "nitrification/denitrification treatment". Thus, due to the presence of microorganisms whose growth is promoted by the oxygen in the air, an aerobic technique is used, the excrement is transformed into an odorless liquid which is constituted by a solution of elements and compounds comprising nitrogen, phosphorous, potassium and other components, while having an organic colloidal portion in suspension in this liquid medium. The ammoniacal nitrogen, which is the odor processing substance decreases by about 95% with this treatment. The porcine excrement thus treated can be used for spreading on fields without trouble from any odor.

U.S. Pat. No. 5,785,730 relates to a fertilizer comprising a dewatered solid agricultural nutrient. A method for preparing this fertilizer is provided including the steps of providing a raw agricultural waste to be treated, adding to the raw agricultural waste an effective amount of a composition comprising a quaternized amino methylated polyacrylamide polymer for separating the raw agricultural waste into a mixture having a separate clarified liquid portion and a separate dewatered nutrient solids portion, wherein the separated dewatered nutrient solids portion is a fertilizer, mixing the composition with the raw agricultural waste to facilitate the separation of the raw agricultural waste into the mixture, and subjecting the mixture to at least one mechanical separation means for segregating the separated clarified liquid portion from the fertilizer. An aqueous system comprising water, raw agricultural waste and a composition comprising a quaternized amino methylated polyacrylamide polymer is also disclosed. This prior art shows the physical alteration of the product to remove excess water while the present invention alters the physical characteristics to minimize movement of the biosolids prior to and after application.

U.S. Pat. No. 5,593,473 relates to a process for the treatment of porcine excrement, to transform it into fertilizer. To a liquid solution of porcine excrement, a solution of phosphorous pentoxide and potassium oxide is added in suitable proportions to obtain in the final product the desired ratio between nitrogen, phosphorous and potassium and as a function of the nature of the soil and of the type of application, after which the obtained solution is mixed with a product adapted to retain water, having the desired shape of the final product, so as to obtain a shaped and conditioned fertilizer, which is subjected to a drying treatment. Preferably, the water-retentive product is in the form of granules of polyacrylamide, which swell in water to a number of times their size when dry. The granules absorb the liquid very quickly, but releases it only slowly, so that they can swell and dry over and over to have a long effective life. In this prior art, the polyacrylamide mentioned is a co-polymer and not a water soluble polyacrylamide.

U.S. Pat. No. 5,776,350 relates to a method for separating raw agricultural waste into a liquid portion and a nutrient enriched solids portion. The method includes providing raw agricultural waste to be treated, adding to the raw agricultural waste an effective amount of a composition comprising a quaternized amino methylated polyacrylamide polymer for separating the raw agricultural waste into a mixture having a liquid portion and a nutrient solids portion, mixing the composition with the raw agricultural waste to facilitate the separation, and subjecting the mixture to at least one mechanical separation means for segregating the separated liquid portion from the separated nutrient solids portion. A method for transforming raw agricultural waste into a clarified liquid portion and a dewatered nutrient enriched solids portion is also taught. In this prior art, the polyacrylamide is used to separate the biosolids. However, the method of the present invention controls the movement of biosolids before, during, and after land application.

SUMMARY OF THE INVENTION

The present invention relates to a method of controlling the movement of biosolids before, during, and after land application. It is an object of the present invention to provide the benefits of drying and granulating, but leave the biosolid in an amended state with the addition of WSPAM to be reapplied with significantly less runoff and leaching of the biosolids. It is an object of the present invention to address the problem of soil erosion with greater crop yields. Greater crop yields brings more money to easily exceed the cost of the application. Less erosion, less runoff, and less leaching means less fertilizer required which reduces the farmers' cost. The environmental agencies, and the sports enthusiast all benefit from the cleaner waters and the willing participation of the farmers.

It is an object of the present invention for the biosolids to be altered where even the smallest particles of biosolids seek to bond themselves together. When applied to the soils, these same characteristics then seek to bond with the soils to hold the biosolids in place. Phosphates built up in the soils, stay in the soils. Erosion of soils is reduced. Microbes are not destroyed but held in place to pose no further threat to nearby environmentally sensitive areas. Biosolids can now be returned to the soil while also managing erosion control, nutrient leaching, microbe control, fertilizer runoff, and groundwater concerns for their soils. It is an object of the present invention to aid in the management of the problematic movement (i.e. runoff and leaching) of land applied biosolids components that have been shown to be harmful to human and/or environmental health through both direct and indirect routes of exposure.

The present invention relates to a method of controlling the movement of biosolids before, during, and after land application of the biosolids. The method comprises combining WSPAM and the biosolids prior to land application creating an amended biosolids. The combination results in a desired ratio of WSPAM to biosolids by use of industry standards feeding equipment and/or other means. The amended biosolids is then metered to the soil. The biosolids comprise a mixture of 0.01% to 85% weight percent solids.

The present invention relates to a method of land applying WSPAM to control the movement of biosolids before, during, and after land application of the biosolids. The method comprises combining WSPAM and the biosolids to create an amended biosolid prior to the time of land application. The biosolid serves as the carrier and delivery system for the WSPAM. The combination results in the desired ratio of the WSPAM to biosolids by use of industry standard feeding equipment and/or other means. The amended biosolids are metered to the soil. The biosolids comprise a mixture of 0.01% to 85% weight percent solids.

It is an object of the present invention for the amended biosolid to comprise: a biosolid and soil stabilizer, wherein the soil stabilizer is selected from the group consisting of: start xanthate, acid hydrolyzed cellulose microfibrils, chitin, gypsum, PAM, WSPAM, hydrocolloidal polysaccharide, acrylic copolymers, sodium acrylate, polyacrylamide, polyethylene-imines, polyamides-amines, polyamines, polyethylene-oxide, and sulfonated compounds, soil conditioners or a combination thereof, wherein the biosolids comprise a mixture of 0.01% to 85% weight percent solids.

It is an object of the present invention for the soil stabilizer to be selected from the group consisting of: a material that was previously treated with an ingredient that has soil stabilizing properties, or a material that was derived from potable water treatment, dewatering of sewage sludges, washing and peeling of fruits and vegetables, clarification of sugar juice and liquor, adhesives and paper in contact with food, animal feed thickeners and suspending agents, cosmetics, paper manufacturing, various mining and drill applications, or a combination thereof. It is an object of the present invention for the amended biosolid to further comprise: aluminum sulfate and/or calcium oxide.

It is an object of the present invention for the amount of soil stabilizer metered to the soil to be controlled by the rate of the biosolid metered to the soil. It is an object of the present invention for the biosolids to be separated through mechanical or non-mechanical means to create a liquid biosolid and a semisolid biosolid prior to land application. It is an object of the present invention for the liquid biosolid and the semisolid biosolids to be secondarily treated, either one or the other with metered WSPAM. It is an object of the present invention for the liquid biosolid to be used as a non potable water supply, wash down water.

It is an object of the present invention for the biosolids to comprise animal manure, animal feed, animal bedding, farmyard scrapings, poultry, animal urine, animal milk and/or animal washings. It is object of the present invention for the metered WSPAM to be cationic. It is an object of the present invention for the metered WSPAM to be anionic. It is an object of the present invention for the metered WSPAM to be nonionic.

It is an object of the present invention for the WSPAM to become soluble prior to the time of land application. It is an object of the present invention for the solubilized WSPAM to bind to the soil at the time of application, wherein the binding occurs prior to any rainfall and/or irrigation. It is an object of the present invention for the WSPAM to ionically bond to the biosolids prior to the time of application. It is an object of the present invention for the amended biosolid to bind to the soil and hold the biosolids in the soil.

It is an object of the present invention for the amended biosolid to control biosolid runoff. It is an object of the present invention for the amended biosolids to control biosolid leaching. It is an object of the present invention for the amended biosolids to control biosolid microbe movement.

It is an object of the present invention for the amended biosolids to reduce the total fecal coliform bacteria and fecal strep leaching and runoff from the soil. It is an object of the present invention for the amended biosolid to reduce soil erosion. It is an object of the present invention for the amended biosolid to assist in controlling surface moisture of the soil. It is an object of the present invention for the amended biosolid to control ground water contamination. It is an object of the present invention for the amended biosolid to increase permeability of the soil. It is an object of the present invention for the amended biosolid to bind to the soil to increase infiltration within the soil.

It is an object of the present invention for the amended biosolids to improve water infiltration of the soil, thereby improving the soils ability to absorb water. It is an object of the present invention for the amended biosolids to improve water infiltration of the soil, thereby reducing the amount and/or frequency of water needed for the soil. It is an object of the present invention for the amended biosolids reduce soil packing and cracking. It is an object of the present invention for the amended biosolid to improve soil tillability.

It is an object of the present invention for the amended biosolids to act as an anticrusting agent in the soil. It is an object of the present invention for the amended biosolids to reduce rilling of the soil. It is an object of the present invention for the amended biosolids to control erosive forces by holding soils in place and ionically bonding them together to increase particle size. It is an object of the present invention for the amended biosolids to prevent movement of the sediment containing nutrient, pesticides and other matter.

The present invention relates to a method of reducing amounts of fertilizer required for successful plant growth comprising applying to soil by conventional application equipment an amended biosolids and releasing the amended biosolids into the soil. It is an object of the present invention for the amended biosolid to control fertilizer runoff. It is an object of the present invention for the amended biosolid to control fertilizer leaching. It is an object of the present invention for the amended biosolids to reduce erosion of the soil, thereby reducing erosion of fertilizer, thereby reducing fertilizer usage and fertilizer cost per acre. It is an object of the present invention for the amended biosolids to improve water infiltration of the soil, thereby reducing erosion of fertilizer, thereby reducing fertilizer usage and fertilizer cost per acre.

It is an object of the present invention for the amended biosolids to hold the nutrients in the soil, thereby reducing fertilizer usage and cost per acre. It is an object of the present invention for the amended biosolid to improve utilization of fertilization by intended plants in the soil. It is an object of the present invention for the WSPAM to be specifically used to control root zone moisture. It is an object of the present invention for the WSPAM to be specifically used to control crop nutritional needs. It is an object of the present invention for the amended biosolid to improve survival and growth of plants. It is an object of the present invention for the amended biosolids to reduce the time for seed emergence within the soil.

It is an object of the present invention for the amended biosolids to improve the root growth of the plants within the soil. It is an object of the present invention for the amended biosolids to improve the crop yield within the soil. It is an object of the present invention for the amended biosolids to result in a cleaner harvest of the root crop. It is an object of the present invention for the amended biosolids to expedite crop maturity. It is an object of the present invention for the amended biosolids to increase the viability of shrub, tree, and/or vegetable transplants. It is an object of the present invention for the amended biosolids to deepen plant rooting in the soil. It is an object of the present invention for the amended biosolids to advance planting dates by drying the soil environment faster.

It is an object of the present invention for the amended biosolids to improve crop quality in the soil. It is an object of the present invention for the amended biosolid to increase germination rates of the seed in the soil. It is an object of the present invention for the amended biosolids to reduce soil-borne diseases. It is an object of the present invention for the biosolid to increase the lateral root system of plants.

The present invention relates to a method of applying cross-linked polyacrylamide and water soluble polyacrylamide to soil comprising; adding cross-linked polyacrylamide and water soluble polyacrylamide to a biosolids, and applying the biosolids to the soil. The cross-linked polyacrylamide and water soluble polyacrylamide is released out of the biosolids into the soil.

It is an object of the present invention for the biosolids used to apply the cross-linked polyacrylamide to the soil to comprise a biosolid and cross-linked polyacrylamide.

The present invention relates to a method of treating soil with an amended biosolids comprising: applying to the soil by conventional equipment an amended biosolid. The amended biosolid comprises a biosolid and WSPAM. The amended biosolid is then released into the soil.

The present invention relates to a method of conditioning soil comprising; applying to the soil by conventional application equipment an amended biosolid. The amended biosolid comprises biosolid and WSPAM. The biosolid and the WSPAM are released into the soil.

The present invention relates to a method of reducing soil erosion comprising; applying to the soil by conventional application equipment an amended biosolid. The amended biosolid comprises biosolid and WSPAM. The biosolid and the WSPAM are released into the soil.

The present invention relates to a method of improving soil penetration comprising: applying to the soil by conventional application equipment an amended biosolid. The amended biosolid comprises a biosolid and WSPAM. The biosolid and the WSPAM are released into the soil.

DETAILED DESCRIPTION OF THE INVENTION

The present invention relates to a method of controlling the movement of biosolids before, during, and after land application. The present invention provides the benefits of drying and granulating, but leaves the biosolid in an amended state with the addition of WSPAM to be reapplied with significantly less runoff and leaching of the biosolids. The present invention assists in less soil erosion with greater crop yields, which gives more money to the farmer. Less erosion, less runoff, and less leaching means less fertilizer required which reduces the farmers' cost.

The biosolids are altered where even the smallest particles of biosolids seek to bond themselves together. When applied to the soils, these same characteristics then seek to bond with the soils to hold the biosolids in place. Phosphates built up in the soils, stay in the soils. Microbes are not destroyed but held in place to pose no further threat to nearby environmentally sensitive areas. Biosolids are returned to the soil while also managing erosion control, nutrient leaching, microbe control, fertilizer runoff, and groundwater concerns for their soils. The present invention aids in the management of the problematic movement (i.e. runoff and leaching) of land applied biosolids components that have been shown to be harmful to human and/or environmental health through both direct and indirect routes of exposure.

The present invention controls the movement of biosolids before, during, and after land application of the biosolids. In one embodiment, the method comprises combining WSPAM and the biosolids prior to land application creating an amended biosolids. The combination results in a desired ratio of WSPAM to biosolids by use of industry standards feeding equipment and/or other means. The amended biosolids is then metered to the soil. The biosolids comprise a mixture of about 0.01% to 85% weight percent solids.

The present invention relates to a method of land applying WSPAM to control the movement of biosolids before, during, and after land application of the biosolids. In an embodiment, the method comprises combining WSPAM and the biosolids to create an amended biosolid prior to the time of land application. The biosolid serves as a carrier and delivery system for the WSPAM. The combination results in the desired ratio of the WSPAM to biosolids by use of industry standard feeding equipment and/or other means. The amended biosolids are metered to the soil. The biosolids comprise a mixture of about 0.01% to 85% weight percent solids.

In an embodiment, the amended biosolid comprises: a biosolid and soil stabilizer, wherein the soil stabilizer is selected from the group consisting of: start xanthate, acid hydrolyzed cellulose microfibrils, chitin, gypsum, PAM, WSPAM, hydrocolloidal polysaccharide, acrylic copolymers, sodium acrylate, polyacrylamide, polyethylene-imines, polyamides-amines, polyamines, polyethylene-oxide, and sulfonated compounds, soil conditioners or a combination thereof, wherein the biosolids comprise a mixture of about 0.01% to 85% weight percent solids.

In an embodiment, the soil stabilizer is selected from the group consisting of: a material that was previously treated with an ingredient that has soil stabilizing properties, or a material that was derived from potable water treatment, dewatering of sewage sludges, washing and peeling of fruits and vegetables, clarification of sugar juice and liquor, adhesives and paper in contact with food, animal feed thickeners and suspending agents, cosmetics, paper manufacturing, various mining and drill applications, or a combination thereof. In an embodiment, the amended biosolid can further comprise: aluminum sulfate and/or calcium oxide.

In an embodiment, the amount of soil stabilizer metered to the soil is controlled by the rate of the biosolid metered to the soil. In an embodiment, the biosolids are separated through mechanical or non-mechanical means to create a liquid biosolid and a semisolid biosolid prior to land application. In an embodiment, the liquid biosolid and the semisolid biosolids are secondarily treated, either one or the other with metered WSPAM. In an embodiment, the liquid biosolid is used as a non potable water supply, wash down water.

In an embodiment, the biosolids comprise animal manure, animal feed, animal bedding, farmyard scrapings, poultry, animal urine, animal milk and/or animal washings. The metered WSPAM can be cationic, anionic, or nonionic.

In an embodiment, the WSPAM becomes soluble prior to the time of land application. In an embodiment, the solubilized WSPAM binds to the soil at the time of application, wherein the binding occurs prior to any rainfall and/or irrigation. In an embodiment, the WSPAM ionically bonds to the biosolids prior to the time of application. In an embodiment, the amended biosolid binds to the soil and holds the biosolids in the soil.

The amended biosolid controls biosolid runoff, biosolid leaching, biosolid microbe movement. The amended biosolids reduce the total fecal coliform bacteria and fecal strep leaching and runoff from the soil. The amended biosolid reduces soil erosion and assists in controlling surface moisture of the soil. The amended biosolid controls ground water contamination. The amended biosolid increases permeability of the soil and infiltration within the soil.

The amended biosolids improves water infiltration of the soil, thereby improving the soils ability to absorb water, and reducing the amount and/or frequency of water needed for the soil. The amended biosolids reduce soil packing and cracking, and improves soil tillability.

In an embodiment, the amended biosolids act as an anti-crusting agent in the soil. The amended biosolids reduces rilling of the soil. The amended biosolids control erosive forces by holding soils in place and ionically bonding them together to increase particle size. The amended biosolids prevent movement of the sediment containing nutrient, pesticides and other matter.

In an embodiment, the present invention relates to a method of reducing amounts of fertilizer required for successful plant growth comprising applying to soil by conventional application equipment an amended biosolids and releasing the amended biosolids into the soil. The amended biosolid controls fertilizer runoff and fertilizer leaching. The amended biosolids reduce erosion of the soil, thereby reducing erosion of fertilizer, thereby reducing fertilizer usage and fertilizer cost per acre. The amended biosolids improve water infiltration of the soil, thereby reducing erosion of fertilizer, thereby reducing fertilizer usage and fertilizer cost per acre.

In an embodiment, the amended biosolids hold the nutrients in the soil, thereby reducing fertilizer usage and cost per acre. The amended biosolid improves utilization of fertilization by intended plants in the soil. In an embodiment, the WSPAM is specifically used to control root zone moisture, and to control crop nutritional needs. The amended biosolid improves survival and growth of plants. The amended biosolids reduce the time for seed emergence within the soil.

In an embodiment, the amended biosolids improve the root growth of the plants and crop yield within the soil. The amended biosolids result in a cleaner harvest of the root crop. The amended biosolids expedite crop maturity. Further, the amended biosolids increase the viability of shrub, tree, and/or vegetable transplants. The amended biosolids deepen plant rooting in the soil, and advance planting dates by drying the soil environment faster.

The amended biosolids improve crop quality in the soil. The amended biosolid increases germination rates of the seed in the soil. The amended biosolids reduce soil-borne diseases and increase the lateral root system of plants.

The present invention relates to a method of applying cross-linked polyacrylamide and water soluble polyacrylamide to soil comprising; adding cross-linked polyacrylamide and water soluble polyacrylamide to a biosolids, and applying the biosolids to the soil. The cross-linked polyacrylamide and water soluble polyacrylamide is released out of the biosolids into the soil. In an embodiment, the biosolids used to apply the cross-linked polyacrylamide to the soil comprise a biosolid and cross-linked polyacrylamide.

In an embodiment, the present invention relates to a method of treating soil with an amended biosolids comprising: applying to the soil by conventional equipment an amended biosolid. The amended biosolid comprises a biosolid and WSPAM. The amended biosolid is then released into the soil.

In an embodiment, the present invention relates to a method of conditioning soil comprising; applying to the soil by conventional application equipment an amended biosolid. The amended biosolid comprises biosolid and WSPAM. The biosolid and the WSPAM are released into the soil.

In an embodiment, the present invention relates to a method of reducing soil erosion comprising; applying to the soil by conventional application equipment an amended biosolid. The amended biosolid comprises biosolid and WSPAM. The biosolid and the WSPAM are released into the soil.

In an embodiment, the present invention relates to a method of improving soil penetration comprising: applying to the soil by conventional application equipment an amended biosolid. The amended biosolid comprises a biosolid and WSPAM. The biosolid and the WSPAM are released into the soil.

EXAMPLE

Biosolids are traditionally collected directly from the source and land applied. In the simplest form, in the present invention biosolids are collected and blended with WSPAM utilizing a pug mixer, such as a FEECO pug mixer, or similar mixing apparatus. The Biosolids are then land applied in the same traditional manner, however gaining the significant benefits of the blended product.

In a more complex example, BioSolids are separated into liquid and sludge (solids) waste streams as a primary separation. WSPAM aids in the separation of the two streams initially or it is done by mechanical separation, such as a screw press or both. Once separated the liquid stream can then go through a secondary separation using WSPAM to further clarify the liquid stream. The clarified water would then be recycled back to operations. Irrigation use and washdown water are two examples of recycled use of the water. The solids collected from the secondary liquid separation could be added to the primary sludge stream and handled together. The combined sludge stream can also be metered with additional WSPAM and then land applied as a blended Biosolid with WSPAM using traditional equipment. The blended Biosolid monetary value increases allowing for further transport to farms not logistically reasonable due to financial reasons.

The invention claimed is:

1. A method of controlling the movements of biosolids before, during, and after land application of said biosolids comprising;
    combining WSPAM (water soluble polyacrylamide) and said biosolids to form amended biosolids, wherein said combination occurs prior to land application;
    combining said WSPAM and said biosolids in a desired ratio using industry standard feeding equipment;
    metering said amended biosolids to said soil;
    binding said amended biosolids to said soil;
    controlling amount of said WSPAM metered to said soil by rate of said biosolids metered to said soil;
    said amended biosolids comprising a mixture of about 0.01% to 85% weight percent solids.

2. The method of claim 1 wherein said amended biosolids are separated through mechanical or non-mechanical means to create a liquid biosolid and a semisolid biosolid prior to land application.

3. The method of claim 2 wherein said liquid biosolid and said semisolid biosolid are secondarily treated, either one or the other with metered WSPAM.

4. The method of claim 3 wherein said liquid biosolid is used as a non-potable water supply.

5. The method of claim 1 wherein said biosolids is selected from the group consisting of animal manure, animal feed, animal bedding, farmyard scrapings, poultry scrapings, animal urine, animal milk, animal washings or a combination thereof.

6. The method of claim 1 wherein said metered WSPAM is anionic.

7. The method of claim 1 wherein said WSPAM is soluble prior to land application.

8. The method of claim 7 wherein said solubilized WSPAM binds to soil during application, and wherein said binding occurs prior to rainfall and/or irrigation.

9. The method of claim 1 wherein said WSPAM ionically bonds to said biosolids prior to application.

10. The method of claim 1 wherein said amended biosolid binds to said soil to hold said biosolids in said soil.

11. The method of claim 1 wherein said amended biosolid controls biosolid runoff.

12. The method of claim 1 wherein said amended biosolid controls biosolid leaching.

13. The method of claim 1 wherein said amended biosolid controls biosolid microbe movement.

14. The method of claim 1 wherein said amended biosolids reduces total fecal coliform bacteria and fecal strep leaching and runoff from said soil.

15. The method of claim 1 wherein said amended biosolid reduces soil erosion.

16. The method of claim 1 wherein said amended biosolid controls surface moisture of said soil.

17. The method of claim 1 wherein said amended biosolid controls ground water contamination.

18. The method of claim 1 wherein said amended biosolid increases permeability of said soil.

19. The method of claim 1 wherein said amended biosolid binds to said soil to increase infiltration within said soil.

20. The method of claim 19 wherein said amended biosolid improves water infiltration of said soil, thereby improving soils ability to absorb water.

21. The method of claim 19 wherein said amended biosolid improves water infiltration of said soil, thereby reducing amount of water needed or frequency of water needed for said soil.

22. The method of claim 1 wherein said amended biosolid reduces soil packing and cracking.

23. The method of claim 1 wherein said amended biosolid improve soil tillability.

24. The method of claim 1 wherein said amended biosolid is an anticrusting agent in said soil.

25. The method of claim 1 wherein said amended biosolid reduces rilling of said soil.

26. The method of claim 1 wherein said amended biosolid controls erosive forces by holding soils in place and ionically bonding them together to increase particle size.

27. The method of claim 1 wherein said amended biosolid prevents movement of sediment containing nutrient, and pesticides.

28. The method of claim 1 wherein said amended biosolid controls fertilizer runoff.

29. The method of claim 1 wherein said amended biosolid controls fertilizer leaching.

30. The method of claim 1 wherein said amended biosolids reduces erosion of said soil, thereby reducing erosion of fertilizer, thereby reducing fertilizer usage and fertilizer cost per acre.

31. The method of claim 1 wherein said amended biosolids improves water infiltration of said soil, thereby reducing erosion of fertilizer, thereby reducing fertilizer usage and fertilizer cost per acre.

32. The method of claim 1 wherein said amended biosolids holds nutrients in said soil, thereby reducing fertilizer usage and cost per acre.

33. The method of claim 1 wherein said amended biosolid serves to improve utilization of fertilizer by intended plants in said soil.

34. The method of claim 1 wherein said amended biosolids improves survival and growth of plants.

35. The method of claim 1 wherein said amended biosolids reduces time for seed emergence within said soil.

36. The method of claim 1 wherein said amended biosolids improves root growth of plants within said soil.

37. The method of claim 1 wherein said amended biosolids improves crop yield within said soil.

38. The method of claim 1 wherein said amended biosolid results in a cleaner harvest of root crop.

39. The method of claim 1 wherein said amended biosolids expedites crop maturity.

40. The method of claim 1 wherein said amended biosolids increases viability of shrub, tree, or vegetable transplants.

41. The method of claim 1 wherein said amended biosolids deepens plant rooting in said soil.

42. The method of claim 1 wherein said amended biosolids advances planting dates by drying soil environment faster.

43. The method of claim 1 wherein said amended biosolids improve crop quality in said soil.

44. The method of claim 1 wherein said amended biosolid increases germination rates of seed in said soil.

45. The method of claim 1 wherein said amended biosolids reduce soil-borne diseases.

46. The method of claim 1 wherein said amended biosolid increases lateral root system of plants.

47. A method of land applying WSPAM (water soluble polyacrylamide) to control movement of biosolids before, during, and after land application of said biosolids comprising;

combining said WSPAM and said biosolids to form an amended biosolids prior to land application, wherein said biosolids serves as a carrier and delivery system of said WSPAM;

combining said WSPAM and said biosolids in a desired ratio using industry standard feeding equipment;

metering said amended biosolids to said soil;

binding said amended biosolids to said soil;

controlling amount of said WSPAM metered to said soil by rate of said amended biosolids metered to said soil;

said amended biosolids comprising a mixture of about 0.01% to 85% weight percent solids.

48. The method of claim 47 wherein said WSPAM is specifically used to control root zone moisture.

49. The method of claim 47 wherein said WSPAM is specifically used to control crop nutritional needs.

50. A method of reducing amounts of fertilizer required for successful plant growth comprising;

applying to soil by conventional application equipment amended biosolids comprised of biosolids and water-soluble polyacrylamide;

controlling amount of said water-soluble polyacrylamide metered to said soil by rate of said biosolids metered to said soil; and releasing said amended biosolids to said soil;

binding said amended biosolids to said soil.

51. A method of applying biosolids to land comprising:

collecting biosolids directly from the land;

separating by a liquid separation said biosolids into liquid and sludge (solids) waste streams as a primary separation using WSPAM (water soluble polyacrylamides);

separating said liquid stream using WSPAM (water soluble polyacrylamides) to further clarify said liquid stream to create a secondary liquid separation;

adding solids collected from said secondary liquid separation to a primary sludge stream and handled together.

52. The method of claim 51 wherein said separation into liquid and sludge is done by mechanical separation.

53. The method of claim 52 wherein said mechanical separation is done by a screw press.

54. The method of claim 51 wherein said liquid stream that is further clarified is recycled.

55. The method of claim 54 wherein said liquid stream that is further clarified is used for irrigation use and washdown water.

56. The method of claim 51 wherein said sludge waste stream is metered with additional WSPAM and then land applied as a blended biosolid with WSPAM.

* * * * *